United States Patent [19]

Campbell et al.

[11] Patent Number: 4,767,525
[45] Date of Patent: Aug. 30, 1988

[54] CLEAN WATER SYSTEM

[75] Inventors: Robert J. Campbell, Cedar Rapids, Iowa; Peter C. Jacobs, Boulder, Colo.

[73] Assignee: American Ozone Technology, Marion, Iowa

[21] Appl. No.: 81,010

[22] Filed: Aug. 3, 1987

[51] Int. Cl.⁴ ............................................. C02F 1/78
[52] U.S. Cl. ...................................... 210/87; 210/105; 210/192; 210/760
[58] Field of Search ................. 210/87, 105, 192, 201, 210/205, 760

[56] References Cited

U.S. PATENT DOCUMENTS

| | | |
|---|---|---|
| 986,194 | 3/1911 | Meeker et al. . |
| 1,102,963 | 7/1914 | Seeley . |
| 1,994,462 | 3/1935 | Bueno . |
| 3,884,819 | 5/1975 | Schultz et al. . |
| 3,899,684 | 8/1975 | Tenney . |
| 3,945,918 | 3/1976 | Kirk ................................ 210/760 X |
| 4,100,421 | 7/1978 | Tabata et al. . |
| 4,104,158 | 8/1978 | Davis ............................ 210/105 X |
| 4,156,653 | 5/1979 | McKnight . |
| 4,167,484 | 9/1979 | Morikawa . |
| 4,430,306 | 2/1984 | Namba et al. . |

Primary Examiner—Charles Hart
Attorney, Agent, or Firm—Hill, Van Santen, Steadman & Simpson

[57] ABSTRACT

A clean water system that has a noval air system and a novel water system in which the dry air to the case of the ozone generator as well as to the ozone generator and has a primary drier, a sensor and reserve drier such that the reserve drier provides dry air after the primary drier has become too wet and the water system includes a pair of concentrically mounted tanks with an overflow such that water can be circulated in a closed loop through the ozone injector and inner tank to purify the water.

9 Claims, 5 Drawing Sheets

CLEAN WATER SYSTEM

CROSS-REFERENCES TO RELATED APPLICATIONS

The present invention is an improvement on application Ser. No. 883,658 filed Jul. 9, 1986 entitled "AIR DRYING SYSTEM FOR AN OZONE APPARATUS" in which the inventors are Craig J. Jensen and Herbert Heyroth.

BACKGROUND OF THE INVENTION

1. Field of the Invention

This invention relates in general to water treatment and in particular to an ozone injecting system in which the air for the ozone generator is dried so as to increase the reliability of the system.

2. Description of the Prior Art

Ozone generators of the prior art have been unreliable and have been subject to high voltage arcing due to moisture in the case containing the high voltage structure. Such systems can produce very small quantities of ozone and moisture inside of the case of the generator can lead to a direct discharge and short in the system.

SUMMARY OF THE INVENTION

The present invention provides for a clean water system which has a very high efficiency and in which the air for the ozone generator is dried and passed through a case which encloses the ozone generator so as to assure that the environment of the ozone generator is dry after which it passes through a primary dryer and a sensor and then through a reserve dryer before passing through the ozone generator. The output of the ozone generator is passed to the injector for injecting it into the water. The sensor detects when the primary dryer has become saturated and gives a warning and the reserve dryer maintains the air dry until the primary dryer can be replaced or rejuvenated.

The system also provides a special tank for the water wherein an outer storage tank surrounds an inner column tank into which the ozone treated water is supplied and from which such ozone treated water is recirculated back in a closed loop through the ozone treatment cycle wherein the treated water from the inner tank flows into the outer tank which is controlled by upper and lower float valves such that the upper float valve supplies input water to the system and the lower float valve provides protection for the system in the event the treated water is used faster than the capacity of the system.

It is a feature of the invention to provide a high efficiency clean water system which has novel air and water flow systems so as to result in an overall improved clean water system treated by ozone.

Other objects, features and advantages of the invention will be readily apparent from the following description and claims when read in view of the drawings in which:

DESCRIPTION OF THE PREFERRED EMBODIMENTS

Figure 2:
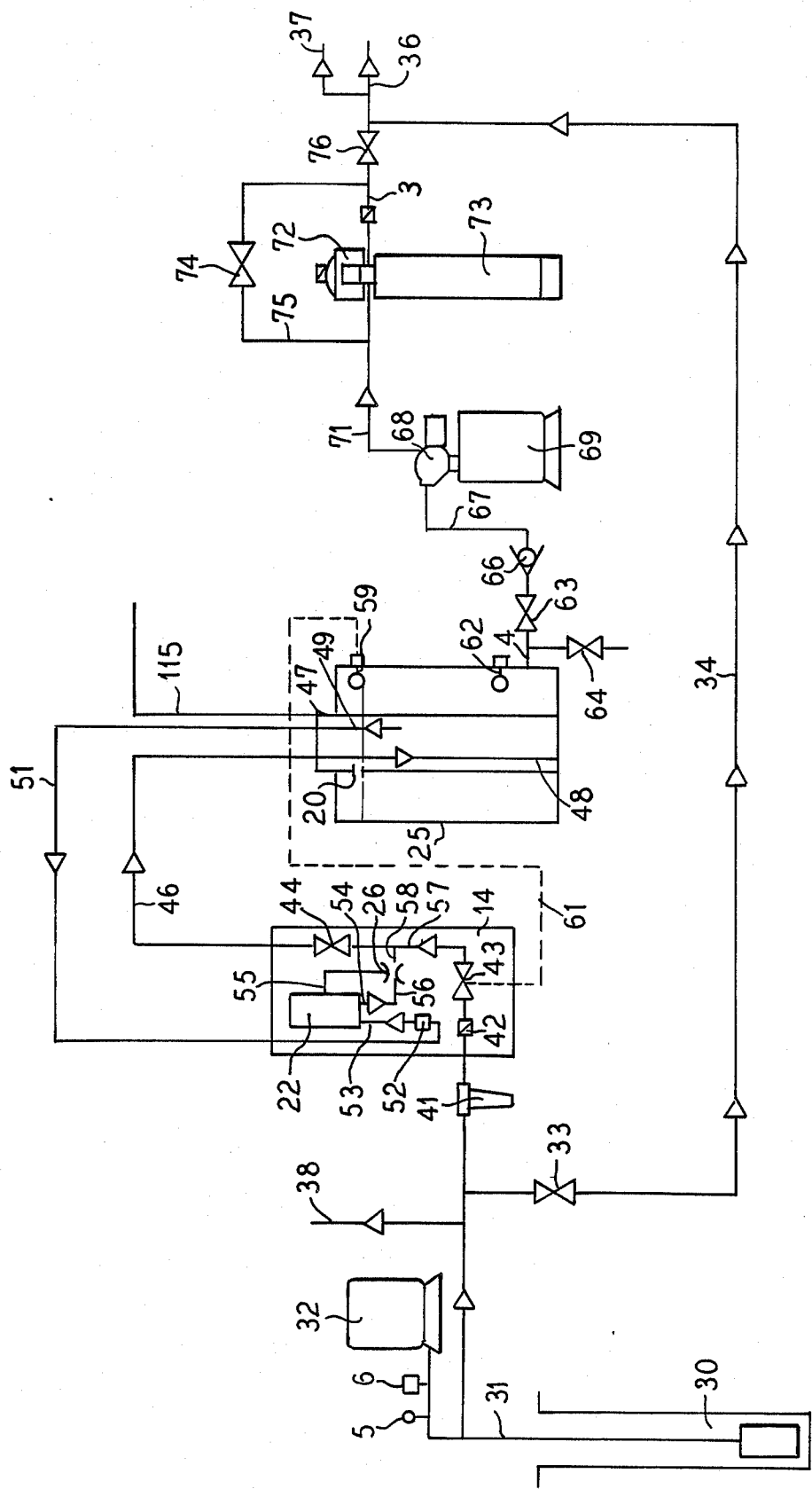
FIG. 2 is a schematic view illustrating the water flow system of the invention.

FIG. 2 illustrates the water flow systems of the invention. A well 30 supplies water through a line 31 to a pressure tank 32 which has a pressure gauge 5 and a pressure switch 6 for controlling pumping motor not shown at predetermined pressure limits. A raw water bypass line 38 is connected to line 31 to supply fixtures which do not need purified water. A bypass valve 33 connects line 31 to a bypass line 34 which is connected to output lines 36 and 37 so as to bypass the clean water system under emergency conditions, for example.

A sediment prefilter 41 is connected to line 31 for removing sedimentations from the incoming water. The output of the prefilter 41 is connected to a panel 14 which includes an inlet flow regulator 42 in the incoming water line. A valve 43 is connected to the output of the regulator 42 and is the incoming water control valve. The incoming water passes in line 57 which has its outlet 48 which discharges near the bottom of a vertical column tank 47. The vertical column tank 47 is mounted inside and surrounded by a storage tank 25 for the clean water. Overflow outlet orifice 20 is formed in the top of the inner column tank 47 so as to overflow water into the storage tank 25. An upper float switch 59 is mounted in an upper portion of the tank 25 and a lower float switch 62 is mounted in a lower portion of the tank 25 as shown. A return pipe 49 has its lower end open near the top of the column tank 47 and is connected to a line 51 which supplies the injection pump 52 which has an output line 53 which passes through the ozone generator 22 for water cooling. The output line 54 from the water cooling passes to a line 56 which passes through the ozone injector 26 to a line 58 which makes a T-connection with the line 57. An ozone gas injector line 55 extends from the ozone gas injector 26 to the ozone generator 22.

An output supply line 4 is connected to the lower portion of the storage tank 25 and a drain valve 64 for draining the system is connected to the line 4. A shutoff valve 63 is connected in line 4 and has an output connected to a check valve 66 so as to prevent water from moving backwards through the system. The check valve 66 is connected to a line 67 which is connected to a pump 68 which supplies a pressure tank 69 with the pressurized water for the system. An output line 71 passes from pressure tank 69 to a post filter bed 73 wherein particulate particle matter is removed and the output line 3 of the postbed filter 73 is connected to a valve 76 which is connected to the output conduits 36 and 37 for supplying the pure water. A valve 74 and a conduit 75 are connected between the output line 3 and the input line 71 of the post filter bed 73 so as to bypass the filter 73. A backwash valve 72 is mounted to the post filter bed 73 so as to backwash the filter 73 to rejuvenate it when desired.

Figure 1:
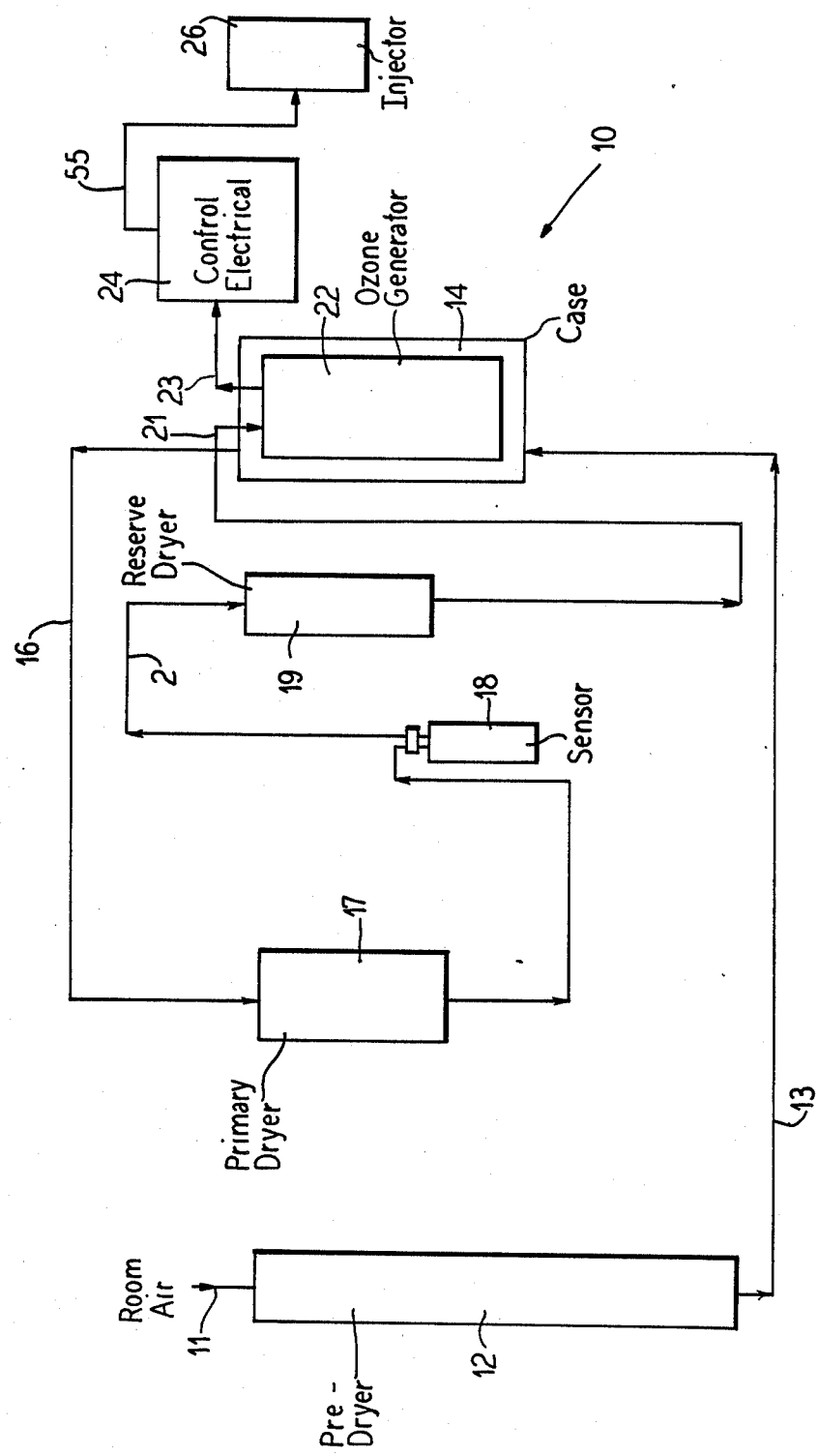
FIG. 1 is a schematic view illustrating the air flow system of the invention.

FIG. 1 is a schematic view illustrating the air flow system of the invention and it is to be realized that in the present invention it has been discovered that by maintaining the air dry which is supplied to the ozone generator 22 that a much greater reliability in converting air to ozone results. Furthermore, it has been realized by the inventors that the ozone generator 22 should be mounted in a pneumatic sealed case 14 so that the air which surrounds the ozone generator 22 will be dry as this results in no condensation on the high voltage plates of the ozone generator which reduces the chance of shorting the high voltage on the plates of the ozone generator. The air line 23 going from the ozone generator 22 passes through a solenoid valve 55A to prevent any water from the injector 26 from getting to the generator 22 and shorting out the high voltage plates.

As shown in FIG. 1, ambient air is supplied by a conduit 11 to a predryer 12 and a conduit 13 supplies the output air from the dryer 12 to the case 14 in which the ozone generator 22 is mounted. An output line 16 supplies air from the case 14 to a primary dryer 17 which supplies an output to a sensor 18 which senses the moisture content in the air passing therethrough and supplies the output air through a line 2 to a reserve dryer 19. The output from the reserve dryer 19 is supplied on line 21 to the ozone generator 22 where it passes between the electrical plates of the generator 22 and is at least partially converted into ozone and supplied to an output line 23 which passes through the case of the electrical control 24 and by a line 55 to the ozone injector 26 illustrated, for example, in FIG. 2.

Figure 3:
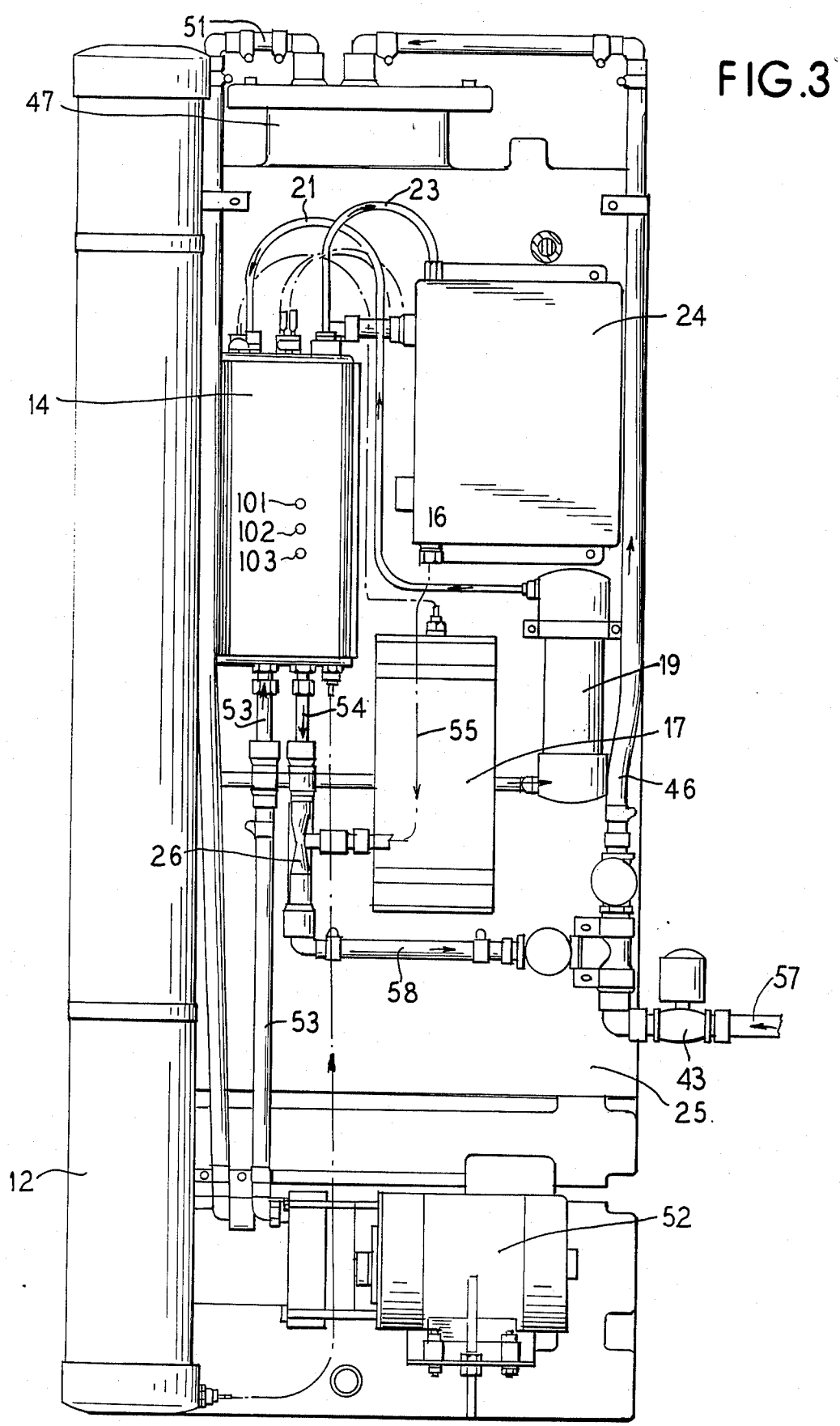
FIG. 3 is a plan view illustrating the clean water system of the invention.

FIG. 3 is a plan view illustrating the physical layout of the cleanwater system of the invention and illustrates the outer storage tank 25 as well as the case 14 in which the ozone generator 22 is mounted. Also, it shows the primary dryer 17, the reserve dryer 19 and the predryer 12. The ozone injector 26 is shown which connects with the T-valve to input line 57 and output line 46. The column tank 47 can be seen at the top. The case 14 has three indicator lights 101, 102 and 103. Indicator 101 indicates power on when lighted, indicator 102 is connected to the sensor 18 and indicates when the dryer should be changed. Light 103 indicates air flow.

Figures 4, 5:
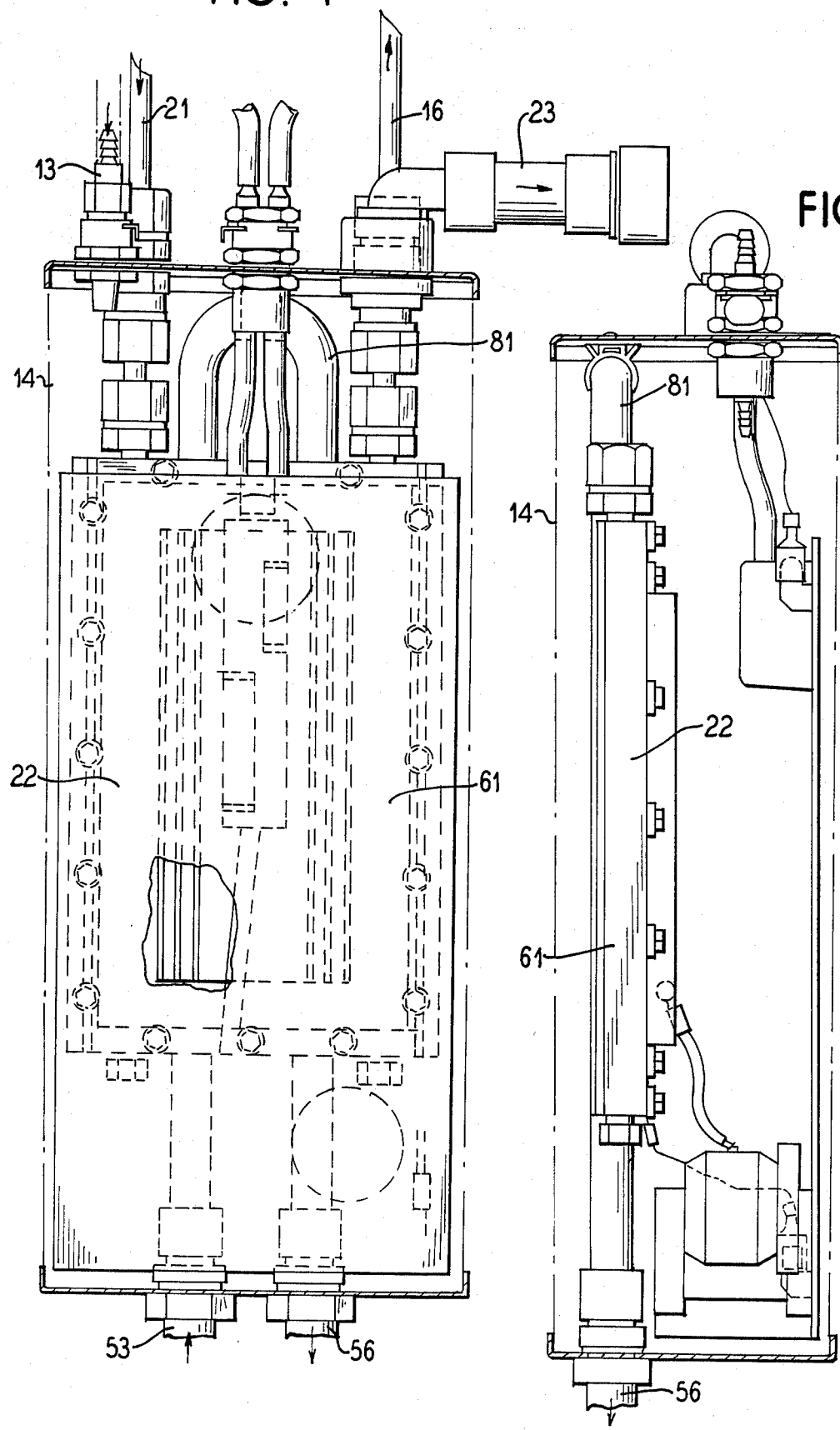
FIG. 4 is a plan view of the ozone generator.
FIG. 5 is a side plan view of the ozone generator.

FIG. 4 illustrates the case 14 in which the ozone generator 22 is mounted. The ozone generator 22 may be of the type disclosed and illustrated in copending application Ser. No. 883,658, filed Jul. 9, 1986 referenced above.

FIG. 5 is a side view of the case 14 and the ozone generator 22.

Figure 6:
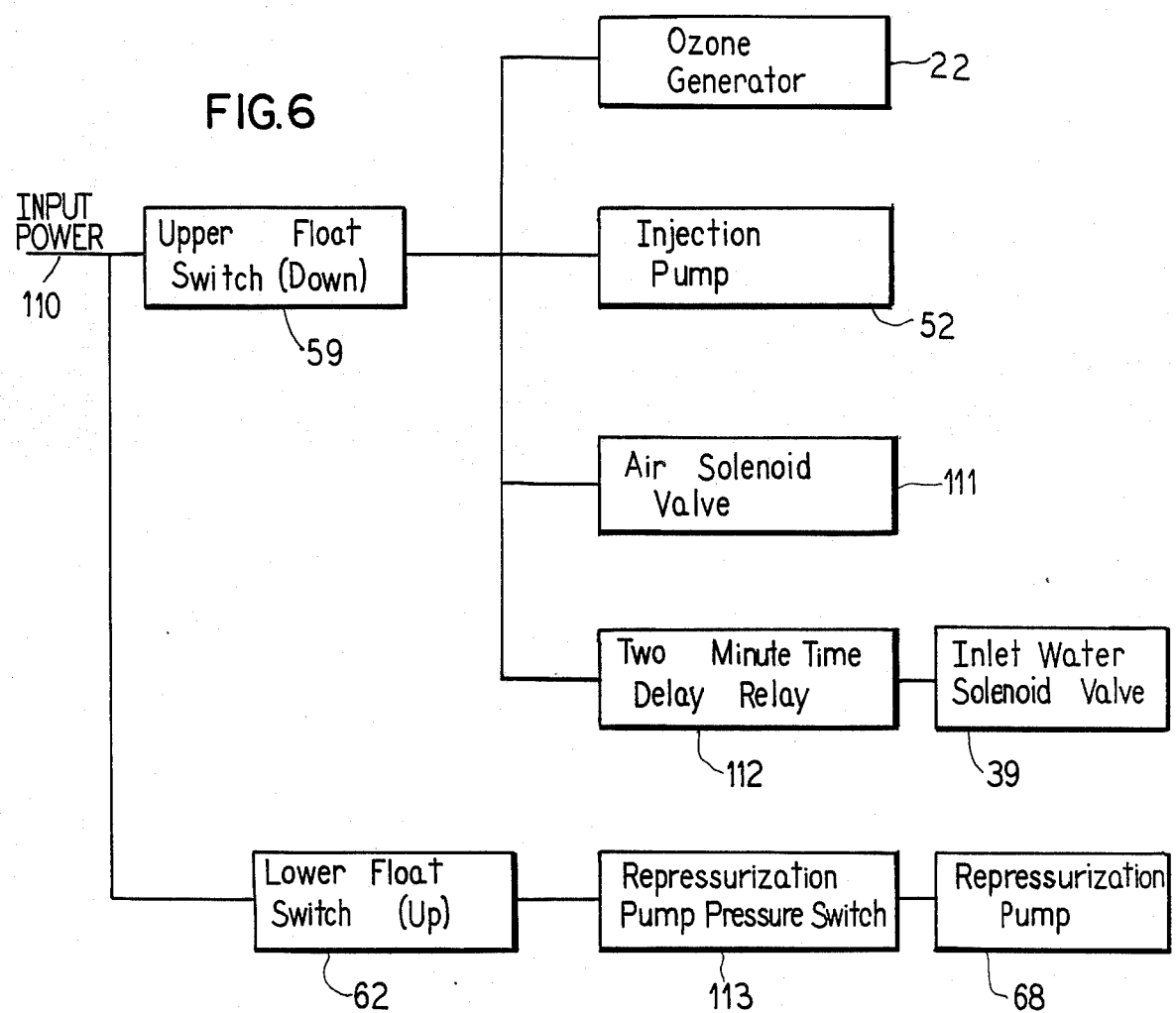
FIG. 6 is an electrical schematic of the control system of the invention.

FIG. 6 illustrates the main wiring electrical control and shows the input power line 110 connected to the upper float switch 59 and to the lower float switch 62. The upper float switch 59 is connected to the ozone generator 22, the injection pump 52 and an air solenoid valve 111. A two minute time delay 112 is connected to the power through the float switch 59 and supplies power to the inlet water solenoid valve 39. Power is supplied through lower flow switch 62 to the pressurization pump and pressure switch 113 and to a repressurization pump 68.

A vent line 115 from the column tank 47 allows gases to be vented.

The fact that the air in the case 14 is dried because it is sealed prevents condensate from forming and, thus, results in a more reliable system. The primary dryer dries air to $-30°$ to $-60°$ C. dew point and may be of the dessicant type. The sensor 18 is capable of sensing humidity in the 1 to 10% relative humidity range and when the moisture goes above this range, the light 102 is illuminated to indicate that the dryer should be changed and the solenoid valve 111 is closed. The reserve dryer 19 is capable of drying the air after the primary dryer needs to be replaced or rejuvenated for one or more days and also compensates for the delay in the sensor which may be up to four hours depending on the type of dessicant used.

An solenoid valve 111 allows the ozone to pass through, to prevent back flow of water into the ozone generator.

The outer tank 25 contains water in which particles will gather and settle out in the outer tank. When the amount of water withdrawn to the output line 41 draws the water in the outer tank 25 below the float valve 59, the float valve 59 turns on the input valve 43 with electrical line 61 so that more water will enter in the system. The bottom float valve 62 turns off the pumps in case the outer tank 25 becomes dry so that the pumps will not burn out. The filter 73 removes solids and other particulate from the output water.

It is to be realized that the water in the column tank 47 is being continuously circulated through the line 51 to the line 56 and through the ozone injector 26 and then back through the line 46 into the bottom of tank 47. This continuous circulation and injecting of ozone into the water in the column 47 provides oxidation and disinfection and then the water overflows through the orifice 20 into the storage tank 25.

Although the invention has been described with respect to preferred embodiments, it is not to be so limited as changed and modifications can be made which are wihtin the full intended scope of the invention as defined by the appended claims.

We claim as our invention:

1. An air drying system for an ozone generator which is mounted in an air sealed case comprising, a predrier which receives ambient air, said air sealed case of said ozone generator connected to receive output air from said predrier, a primary drier connected to receive output air from said case, a sensor connected to the output air of said primary drier, a reserve drier connected to receive the output air of said primary drier and to supply input air to said ozone generator which converts a portion thereof to ozone and an ozone injector connected to said ozone generator to receive said ozone and to inject it into a water supply.

2. An air drying system according to claim 1 including an indicator connected to said sensor to indicate the moisture content in said air which is supplied to said sensor by said primary drier.

3. A water purifying system comprising, an ozone generator to which dry air is supplied, an ozone injector connected to said ozone generator, water cooling passages formed in said ozone generator to which an input first conduit and an output second conduit are connected, said output second conduit connected to said ozone injector and ozone injected into water passing therethrough, a third conduit connected to said ozone injector, a tank connected to said third conduit and receiving water therefrom which enters said tank near the bottom thereof, a fourth conduit extending from adjacent the top of said tank to said input first conduit of said ozone generator, and a sixth conduit connected to said tank from which purified water can be removed.

4. A water purifying system according to claim 3 including a seventh conduit with its output connected to said third conduit, and unpurified water connected to the input of said seventh conduit.

5. A water purifying system according to claim 4 wherein said tank has two separate compartments with a first compartment in which the outlet of said third conduit and the inlet of said fourth conduit are mounted, and a second compartment which is fluidly connected to said first compartment by an output near the top of said first compartment and said sixth conduit connected to said second compartment.

6. A water purifying system according to claim 5 including a first valve connected in said seventh conduit, an upper water level sensing means mounted in an upper portion of said second compartment and connected to control said first valve to open it when the water level in said second compartment falls below a preset level.

7. A water purifying system according to claim 6 including a lower water level sensing means mounted in a lower portion of said second compartment and second valve mounted in said sixth conduit and controlled by said lower water level sensing means so that it is turned off when the water level in said second compartment falls below a predetermined level.

8. A water purifying system according to claim 6 wherein said first and second compartments are concentrically mounted.

9. A water purifying system according to claim 8 wherein said first compartment is mounted inside said second compartment.

* * * * *